United States Patent
Majumdar (10) Patent No.: US 11,829,429 B2
(45) Date of Patent: *Nov. 28, 2023

(54) METHOD AND APPARATUS OF RANKING LINKED NETWORK NODES

(71) Applicant: KYNDI, INC., San Mateo, CA (US)

(72) Inventor: Arun Majumdar, Alexandria, VA (US)

(73) Assignee: KYNDI, INC., San Mateo, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/900,478

(22) Filed: Feb. 20, 2018

(65) Prior Publication Data
US 2018/0239763 A1      Aug. 23, 2018

Related U.S. Application Data

(60) Provisional application No. 62/460,570, filed on Feb. 17, 2017.

(51) Int. Cl.
*G06F 16/9535* (2019.01)
*H04L 41/046* (2022.01)
(Continued)

(52) U.S. Cl.
CPC .... *G06F 16/9535* (2019.01); *G06F 16/24578* (2019.01); *G06F 16/28* (2019.01);
(Continued)

(58) Field of Classification Search
CPC .... G06F 16/951; G06F 17/2235; G06F 16/00; G06F 17/00
See application file for complete search history.

(56) References Cited

U.S. PATENT DOCUMENTS 6,681,247 B1 * 1/2004 Payton .................. G06F 16/284
                                                            709/217
7,877,385 B2     1/2011 Craswell et al.
(Continued)

FOREIGN PATENT DOCUMENTS

WO     WO 2016/154460 A1     9/2016

OTHER PUBLICATIONS

Broida, Joel G., and Stanley Gill Williamson. A comprehensive introduction to linear algebra. Redwood City, CA: Addison-Wesley, 1989. (Year: 1989).*

(Continued)

*Primary Examiner* — Sherief Badawi
*Assistant Examiner* — William P Bartlett
(74) *Attorney, Agent, or Firm* — Oblon, McClelland, Maier & Neustadt, L.L.P.

(57) ABSTRACT

An apparatus and method are provided for rapidly ranking network nodes according to input ranking criteria. The links (i.e., first-order paths) between nodes are expressed in a first-order path matrix, which is used to generate nth-order path matrices as nth powers of the first-order path matrix and summed as a power series to generate a surrogate ranking operator (SRO) representing as a single matrix operation a sum over paths of all orders. Thus, in contrast to conventional ranking methods that require multiple recursive steps to account for the interrelatedness of linked nodes, a ranking is produced by multiplying the SRO by a state vector representing the input ranking criteria.

16 Claims, 7 Drawing Sheets

(51) Int. Cl.

| | |
|---|---|
| *G06N 5/043* | (2023.01) |
| *G06N 20/00* | (2019.01) |
| *G06F 16/2457* | (2019.01) |
| *G06N 3/006* | (2023.01) |
| *H04L 41/16* | (2022.01) |
| *G06N 20/20* | (2019.01) |
| *H04L 41/147* | (2022.01) |
| *G06N 10/00* | (2022.01) |
| *G06F 16/28* | (2019.01) |
| *G06F 16/901* | (2019.01) |
| *G06F 17/16* | (2006.01) |
| *H04L 67/02* | (2022.01) |

(52) U.S. Cl.
CPC .......... *G06F 16/9024* (2019.01); *G06F 17/16* (2013.01); *G06N 3/006* (2013.01); *G06N 5/043* (2013.01); *G06N 10/00* (2019.01); *G06N 20/00* (2019.01); *G06N 20/20* (2019.01); *H04L 41/046* (2013.01); *H04L 41/147* (2013.01); *H04L 41/16* (2013.01); *H04L 67/02* (2013.01)

(56) References Cited

U.S. PATENT DOCUMENTS

| | | | | |
|---|---|---|---|---|
| 8,316,060 | B1* | 11/2012 | Snyder, II | G06F 16/9024 707/797 |
| 8,755,837 | B2 | 6/2014 | Rhoads et al. | |
| 9,165,040 | B1 | 10/2015 | Hajaj | |
| 9,818,136 | B1 | 11/2017 | Hoffberg | |
| 2005/0259585 | A1* | 11/2005 | Sauermann | G06F 17/16 370/241 |
| 2006/0106902 | A1* | 5/2006 | Howard | G06F 17/16 708/200 |
| 2008/0270390 | A1 | 10/2008 | Ward et al. | |
| 2013/0198372 | A1* | 8/2013 | Wei | H04L 41/142 709/224 |
| 2014/0032580 | A1 | 1/2014 | Majumdar | |
| 2015/0169758 | A1 | 6/2015 | Assom et al. | |
| 2015/0356144 | A1 | 12/2015 | Chawla et al. | |

OTHER PUBLICATIONS

Wheeler, Nicholas, Some Uncommon Matrix Theory, Reed College Physics Departments, Apr. 2012 (Year: 2012).*
Sánchez-Burillo, Eduardo, et al. "Quantum navigation and ranking in complex networks." Scientific reports 2.1 (2012): 1-8. (Year: 2012).*
International Search Report and Written Opinion dated May 14, 2018 in PCT/US2018/018833 (with Search History) citing references AA-AF and AO therein, 19 pages.
First Examination Report dated Apr. 30, 2021, in Indian Patent Application No. 201917032365 (with English-language translation).
Office Action dated Oct. 8, 2021 in corresponding Japanese Patent Application No. 2019-543224 (with English Translation), 8 pages.
Australian Office Action dated Nov. 11, 2021 in Australian Patent Application No. 2018220752, citing document AA therein, 4 pages.
Australian Examination Report dated Oct. 31, 2022 in Australian Patent Application No. 2018220752 filed Feb. 20, 2018, 4 pages.
Korean Notice of Preliminary Rejection dated Oct. 4, 2022 in Korean Patent Application No. 10-2019-7024199 filed Feb. 20, 2018, citing document Nos. 1-2 and 24-25 therein, 9 pages.
Broida, J.G., et al., "Comprehensive Introduction to Linear Algebra", Web Version, 2012, 303 total pages.
Barbarossa, S., et al., "On Sparse Controllability of Graph Signals", IEEE International Conference on Acoustics, Speech and Signal Processing, 2016, pp. 4104-4108.
Supplementary European Search Report issued by the European Patent Office (EPO) dated Dec. 1, 2020 in corresponding European Patent Application No. 18753710.5, citing document AA therein (8 pages).

* cited by examiner

METHOD AND APPARATUS OF RANKING LINKED NETWORK NODES

CROSS REFERENCE TO RELATED PAPERS

This application is based upon and claims the benefit of priority to provisional U.S. Application No. 62/460,570, filed Feb. 17, 2017, the entire contents of which are incorporated herein by reference. This application relates to U.S. Patent Application Ser. No. 15/900,543, "MODEL AND PATTERN STRUCTURE ONLINE UNITAL LEARNING: MAPSOUL" filed Feb. 20, 2018, now U.S. Pat. No. 11,481,456, the entire contents of which are incorporated herein by reference.

FIELD

The illustrative embodiments described herein relate to rapidly applying network information when ranking network nodes according to received ranking criteria, and, more particularly, to ranking node of a network by multiplying a state vector representing the ranking criteria by a matrix that is a surrogate ranking operator.

BACKGROUND

Many technical problems in the computer-related arts essentially reduce to the problem of applying the information provided in an interconnected network of nodes to ranks the nodes according to a particular set of criteria and/or user inputs.

For example, Netflix.com™ can be viewed as a network of digital media content (i.e., movies), and, based on a user's ratings of previously watched and a record of which movies have been watched, recommendations can be provided about which movies the user would likely prefer to watch in the future. This recommendation might be based a network of connections between movies representing their similarities or based Bayesian inferences from correlations and statistical information of the ratings and watching tendencies of other users that have been accumulated over time. Thus, a recommender system like the movie recommendations provided by Netflix.com™ or other online media content providers can be understood as essentially using a particular set of criteria and/or user inputs to provide a ranking of nodes based on the interconnection between the nodes.

Similarly, the World Wide Web can clearly be understood as a network of interconnected nodes (i.e., internet pages/sites interconnected by hyperlinks, related content, etc.). Further, search engines and algorithms, such as Google's™ PageRank algorithm, can be understood as using user inputs (e.g., key words entered as text into a search input) and ranking the nodes of this network according to their both their relative importance (e.g., based on interconnections between the nodes within the network) and also the connections of search criteria (e.g., key words in a text search) to the content of the network nodes.

As technology advances, this pattern of solving the technical problem of ranking data based on an interconnected network is repeated in various contexts from medicine (e.g., using a network of related medical records connected, for example, by similarities in symptoms, treatments, and outcomes, to rank cases similar to a current medical history or to rank procedures likely to achieve a favorable outcome) to social networks to consumer advertising to security and consumer fraud threats to traffic/GPS navigation systems, etc. Accordingly, this technical problem is a significant, recurring problem rooted in computer-related technologies. In view of its significance, this technical problem has been addressed using various approaches, and, in general, one solution to the underlying technical problem of ordering network elements based on (i) a given set of search criteria and (ii) the structure/interconnections of the network is fundamentally and universally applicable among all similarly posed applications of ranking based on networks. For example, it has been proposed that PageRank algorithm can be applied in biochemistry to provide a measure of the relative importance and identify promising drug targets in proteins. Because ranking network/graph nodes is such a common and recurring technical problem improved and faster methods are desired for generating rankings from network information.

For example, a conventional link analysis algorithm, such as the PageRank algorithm, can assign a numerical weighting to each element of a hyperlinked set of documents, such as the World Wide Web, with the purpose of measuring its relative importance within the set. In general the algorithm may be applied to any collection of nodes having content forming the basis of connection, including, e.g., reciprocal quotations and references. A numerical weight is assigned to any given node based on these connections. Further, ranks can be influenced by more than one level of networks corresponding to attributes embedded in the metadata as well as the communicated content (e.g., the author can be ranked according to a network of authors and their interconnections and scholars can be ranked according to a network of interconnections and citations).

For example, in the PageRank algorithm the numerical weight assigned to an element E referred to as the PageRank of E, as described in S. Brin and L. Page, "*The anatomy of a large-scale hypertextual Web search engine*," Computer Networks and ISDN Systems. 30: 107-117 (1998), incorporated herein by reference in its entirety. In particular, a PageRank results from a mathematical algorithm based on the webgraph, created by all World Wide Web pages as nodes and hyperlinks as edges, taking into consideration authority hubs. The rank value indicates an importance of a particular page. A hyperlink to a page counts as a vote of support. The PageRank of a page is defined recursively and depends on the number and PageRank metric of all pages that link to it (i.e., incoming links). Thus, a page that is linked to by many pages with high PageRank receives a high rank itself. The drawback to such a recursive walk through the network is the time and computational resources that it requires. Thus, faster ranking methods are desired for networks, which can also be referred to, more generally, as graphs, which is a more rigorous mathematical term for the data structures that are colloquially referred to as networks.

Moreover, in many cases network/graph representations are not known a priori, and must instead be learned from empirical measurements and data. Various conventional methods are known, such as artificial neural networks (ANNs) and other, to learn patterns based on training data. However, these conventional methods have various drawbacks. Accordingly, better methods of network and pattern learning are desired, which will apply faster, more robust approaches to efficiently learn and model networks and patterns.

BRIEF DESCRIPTION OF THE DRAWINGS

A more complete appreciation of the disclosed inventions and the many attendant advantages thereof will be readily obtained as the same becomes better understood by reference to the following detailed description when considered in connection with the accompanying drawings, wherein.

DETAILED DESCRIPTION

The methods and apparatus described herein overcome the above-discussed deficiencies in conventional methods that rank nodes of a network (also referred to as a graph) using multiple recursive steps to traverse the network nodes. In contrast to conventional methods, the methods described herein draw from insights and analogies to quantum mechanics and quantum field theory in order to generate a surrogate rank operator (SRO) that ranks results from the network in a single operational step. Similar to Richard Feynman's calculus of variations approach to quantum field theory, in which the propagation operator is treated as a summation/integral over all possible states, the SRO is a matrix that can represent in a single operator a summation over all paths in a graph/network, thereby outputting a ranking of the graph/network nodes based on a matrix multiplication between the SRO and a vector representing an input query (e.g., search criteria).

For example, in certain implementations of the methods described herein, the SRO is formulated as a closed-form solution approximating the n-step recursive walk in which an internal walk history (in contrast to true Markovian property) is emulated by a single application to an input concept vector. Here, a network of concepts is being used as a non-limiting example, and the concepts embedded at the nodes are analogized to a points in a discrete space through which a particle/probability wave-function in quantum mechanics (i.e., input concept or search criteria) passes through on its way to evolving to the output (i.e., final quantum state or ranking of concepts). In other words, instead of computing the n-recursive steps of computation of a particle as it moves from one node to the next, taking into account the contribution of the prior vertices (like the typical Bayesian Network) this operator yields a "jump" that evolves the particle (i.e. input concept) directly to the ranking result in a single iteration step.

In certain implementations, this evolution is represented by exponentiating a first-order path matrix to generate the SRO, the first-order path matrix is subject to normalization and bistochasticity conditions.

In certain implementations, the SRO also is path adjusted to remove path redundancies.

First, a description is provided regarding how the SRO is generated from the first-order path matrix. Then a description is provided regarding how the SRO compares to and is many ways analogous to an evolution operator in the Heisenberg-picture of quantum mechanics in a potential-free space (or partition function in a quantum field theory).

Figure 1:
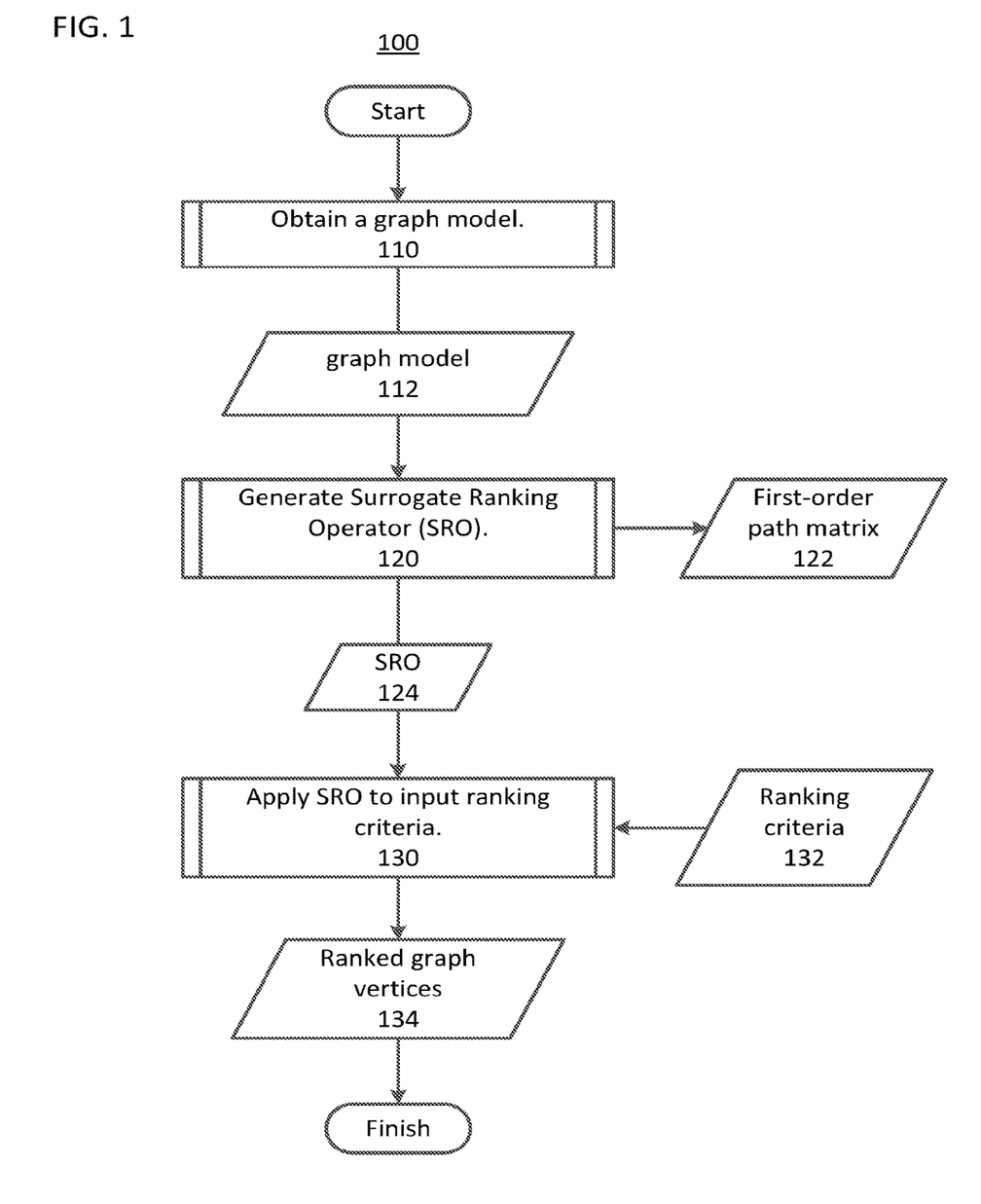
FIG. 1 shows an example of a flow diagram of a method of ranking a network based on input ranking criteria, according to one implementation.

Referring now to the drawings, wherein like reference numerals designate identical or corresponding parts throughout the several views, FIG. 1 shows a flow diagram of method 100 of generating and using a graph model to perform inquiries on the graph information and rapidly generate outputs.

In process 110 of method 100, the graph model 112 is generated. In some cases, the graph model 112 already exists, such as in the case in internet websites and their links. In this case, graph model 112 is simply read from its source or a location in computer readable memory that has been previously stored. In other cases, the model is learned from training data, e.g., using a machine learning method.

Figure 2:
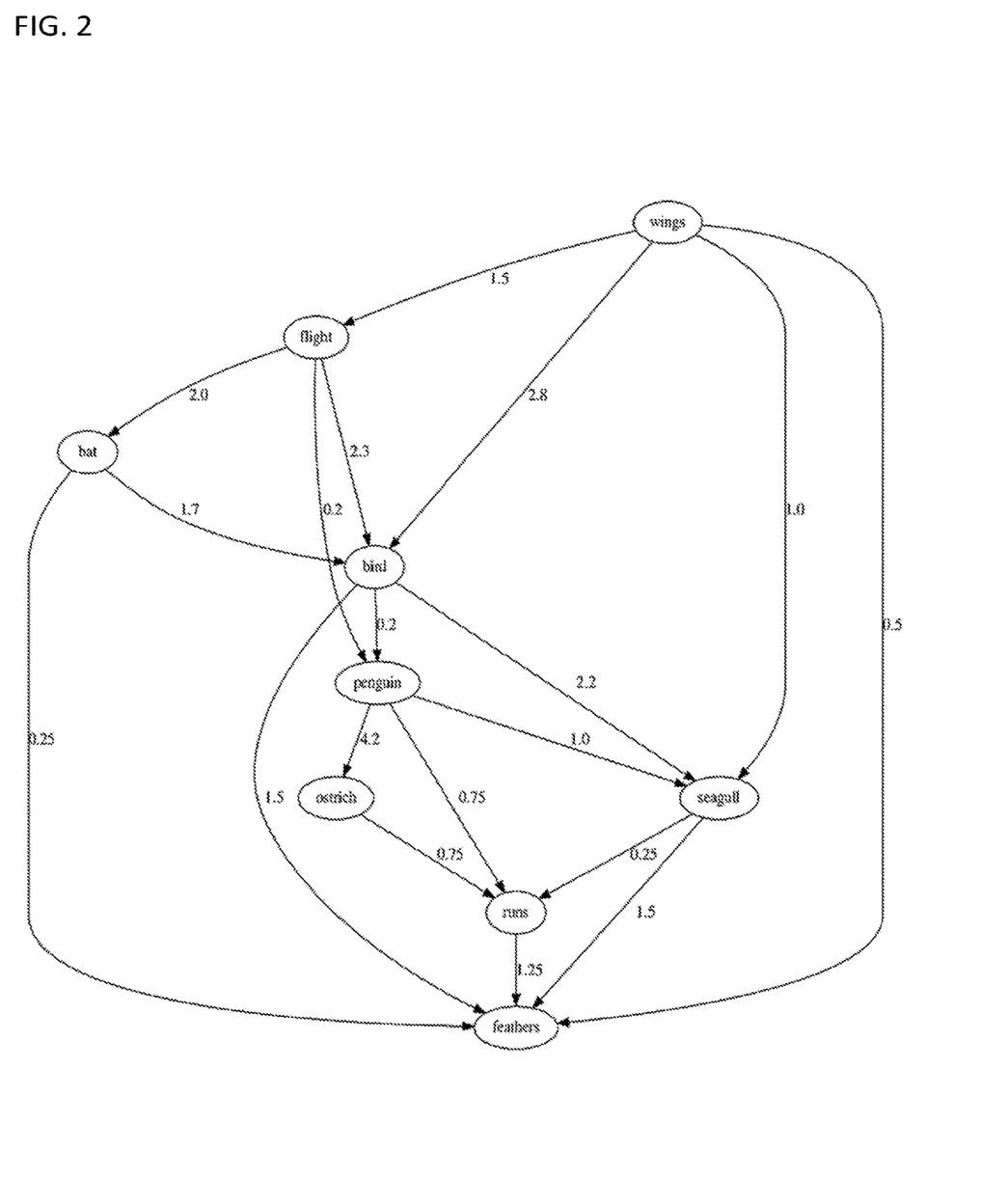
FIG. 2 shows an example of the network of concepts connected by weighted edges/links, according to one implementation.

In process 120 of method 100, the SRO is generated from a first-order path matrix 122 of the graph model 112. The first-order path matrix 122 can take on different representations. For example, as discussed below, the connections between vertices can be represented as positive numbers, real numbers, complex numbers, or bi-convex numbers, depending on whether the edges between vertices in the graph are weighted, directional, etc. Here, the non-limiting example of weighted edges connecting the vertices is used to exemplify the first-order path matrix. The first-order path matrix represents the connections between vertices in the graph. For example, FIG. 2 shows an example of a network of words (i.e., concepts) and the strength of the connections between nodes/vertices of the network/graph represented as weighted edges. The network shown in FIG. 2 is a typical network found in classical artificial intelegence (AI) texts that represents the relationships between various nodes. In general, any networks can be represented by matrices in which each row (column) represents a respective node/vertex. When the edges are not weighted, some variation of a non-weighted adjacency matrix can be used, as would be understood by a person of ordinary skill in the art and as described in U.S. Pat. No. 9,158,847, incorporated herein by reference in its entirety. For the network shown in FIG. 2, which has weighted edges between the vertices, the network can be represented by a matrix is called the first-order path matrix (T) shown in Table 1, in which the concept vector is given by CONCEPTS = [
    'bat',
    'bird',
    'feathers',
    'flight',
    'penguin',
    'ostrich',
    'runs',
    'seagull',
    'wings'
], and the definition of the weighted links between the vertices of the concepts is given by LINKS = [
    ('flight', 2.3, 'bird'),
    ('flight', 2.0, 'bat'), -continued

```
    ('flight', 0.2, 'penguin'),
    ('wings', 2.8, 'bird'),
    ('wings', 1.0, 'seagull'),
    ('wings', 0.5, 'feathers'),
    ('wings', 1.5, 'flight'),
    ('bat', 0.25, 'feathers'),
    ('bat', 1.7, 'bird'),
    ('bird', 0.2, 'penguin'),
    ('bird', 2.2, 'seagull'),
    ('bird', 1.5, 'feathers'),
    ('penguin', 4.2, 'ostrich'),
    ('penguin', 1.0, 'seagull'),
    ('penguin', 0.75, 'runs'),
    ('ostrich', 0.75, 'runs'),
    ('seagull', 0.25, 'runs'),
    ('seagull', 1.5, 'feathers'),
    ('runs', 1.25, 'feathers'),
].
```

A flow chart of one implementation of the process to generate the SRO from the first-order path matrix is shown FIG. 3, which is described below.

TABLE 1

The first-order path matrix (T) of the network shown in FIG. 1.

| [ [ 1.   | 1.7  | 0.25 | 2.   | 0.   | 0.   | 0.   | 0.   | 0.   ] |
|---|---|---|---|---|---|---|---|---|
| [ 1.7  | 1.   | 1.5  | 2.3  | 0.   | 0.2  | 0.   | 2.2  | 2.8  ] |
| [ 0.25 | 1.5  | 1.   | 0.   | 0.   | 0.   | 1.25 | 1.5  | 0.5  ] |
| [ 2.   | 2.3  | 0.   | 1.   | 0.   | 0.2  | 0.   | 0.   | 1.5  ] |
| [ 0.   | 0.   | 0.   | 0.   | 1.   | 4.2  | 0.75 | 0.   | 0.   ] |
| [ 0.   | 0.2  | 0.   | 0.2  | 4.2  | 1.   | 0.75 | 1.   | 0.   ] |
| [ 0.   | 0.   | 1.25 | 0.   | 0.75 | 0.75 | 1.   | 0.25 | 0.   ] |
| [ 0.   | 2.2  | 1.5  | 0.   | 0.   | 1.   | 0.25 | 1.   | 1.   ] |
| [ 0.   | 2.8  | 0.5  | 1.5  | 0.   | 0.   | 0.   | 1.   | 1.   ] ] |

In process 130 of method 100, the SRO is applied to an input vector representing an inquiry regarding the information in the network model, and an output vector is generated representing the answer to the inquiry, as a ranking of the content of the vertices in the graph. We note that "vertex" and "node" can be used interchangeable, as can "network" and "graph" for the following discussion. Accordingly, we will adopt the notation of using only the terms "vertex" and "graph" hereafter.

Returning to the example in FIG. 2 of a graph model 112, in one exemplary implementation of method 100, an inquiry to rank the concepts in the graph according to the ranking criteria of <bird, flight> (i.e., this concept criteria is expressed by the concept vector [0, 1, 0, 1, 0, 0, 0, 0]) returns the following result, when the concept vector for the ranking criteria is multiplied by the SRO:

```
RANKING = [
    ('bird', 0.10682496574236461),
    ('flight', 0.07405044308261416),
    ('wings', 0.06795166019737214),
    ('seagull', 0.05237253912237341),
    ('bat', 0.050509732912895844),
    ('feathers', 0.040901599425686726),
    ('penguin', 0.013721569470986938),
    ('runs', 0.009300038104282584),
    ('ostrich', 0.006327943268444871)
].
```

The number to the right of the concept represents a measure of matching to the ranking criteria. Unsurprisingly, the concepts of 'bird' and 'flight' are highly ranked, as are concepts which are strongly connected to 'bird' and 'flight' like 'wing' and "seagull". Similarly, a ranking inquiry based on ranking criteria of <penguin> returns a ranking of

```
RANKING = [
    ('penguin', 0.05111524080300288),
    ('ostrich', 0.029911422806821922),
    ('runs', 0.014030105982093257),
    ('seagull', 0.009914599034979397),
    ('bird', 0.009838069472489839),
    ('feathers', 0.008170846911161714),
    ('wings', 0.006046069210972645),
    ('flight', 0.0038834999984971),
    ('bat', 0.0027102214155942748)
].
```

Further, a ranking inquiry based on ranking criteria of <bird> returns a ranking of

```
RANKING = [
    ('penguin', 0.05111524080300288),
    ('ostrich', 0.029911422806821922),
    ('runs', 0.014030105982093257),
    ('seagull', 0.009914599034979397),
    ('bird', 0.009838069472489839),
    ('feathers', 0.008170846911161714),
    ('wings', 0.006046069210972645),
    ('flight', 0.0038834999984971),
    ('bat', 0.0027102214155942748)
].
```

Figure 3:
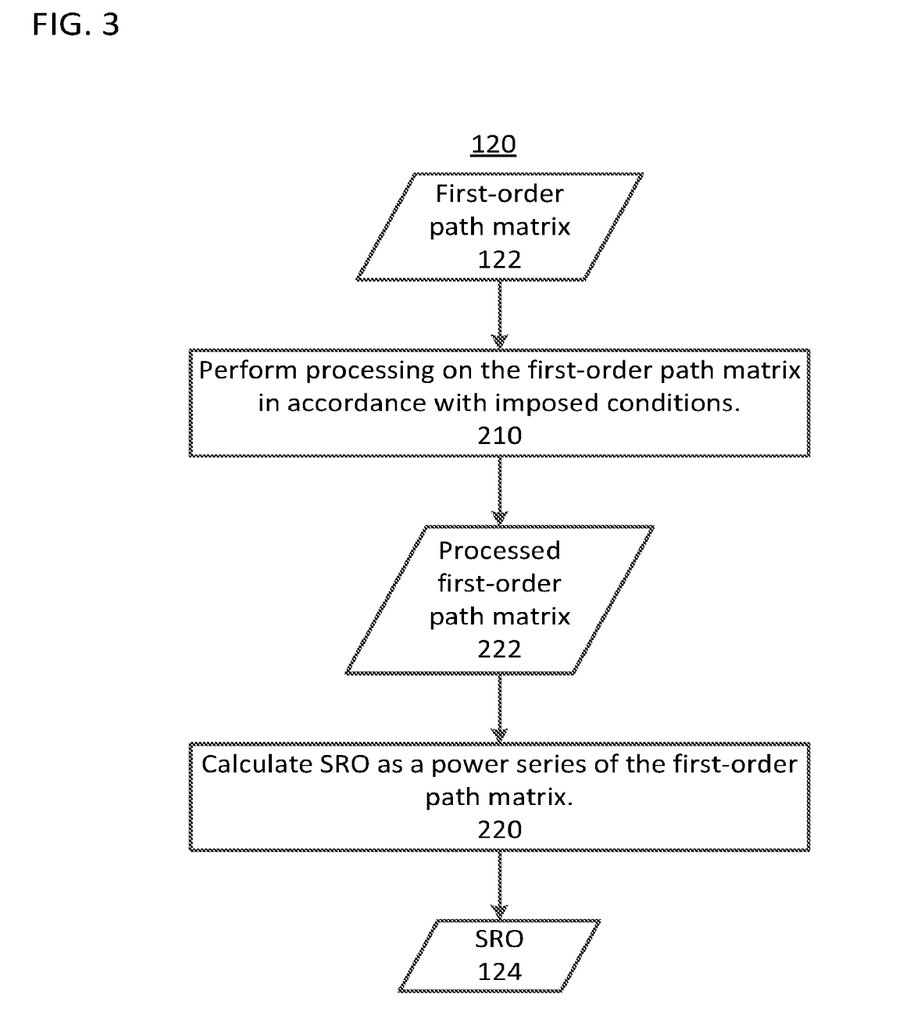
FIG. 3 shows an example of a flow diagram of a process to generate a surrogate ranking operator (SRO), according to one implementation.
Figure 4:
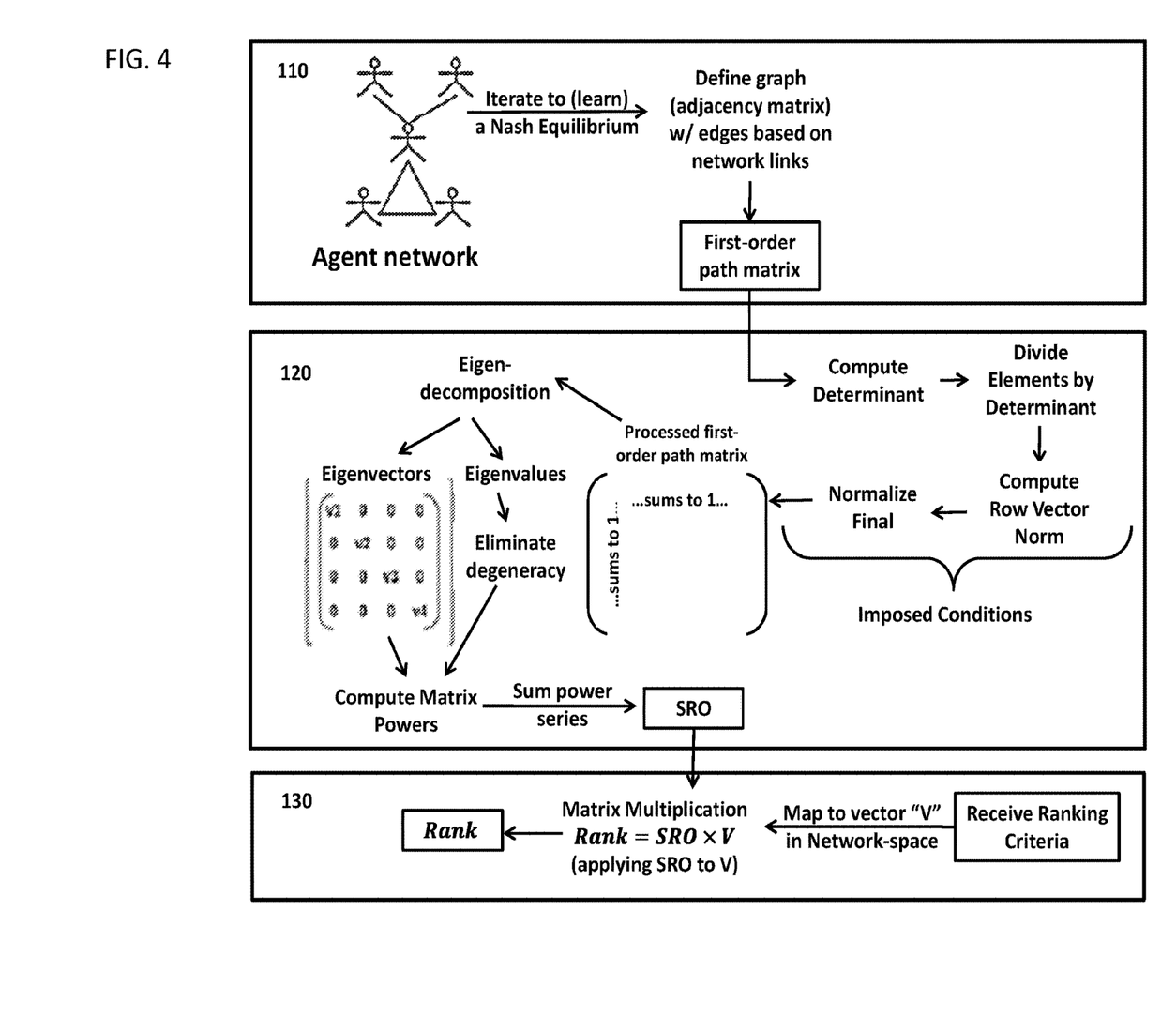
FIG. 4 shows an example of schematic diagram of the method of ranking the network nodes based on the input ranking criteria, according to one implementation.

FIG. 3 shows a flow diagram of one implementation of process 120, and FIG. 4 shows a schematic diagram of an implementation of method 100.

In step 210 of process 120, the first-order path matrix is processed such that it satisfies certain imposed conditions. In certain implementations, conditions of bistochasticity and matrix normalization can be imposed. The normalization condition can be imposed by dividing each element of the matrix by the determinant of the matrix. Additionally, bistochasticity can be imposed, ensuring that each row sums to unity and each column sums to unity. Further, a no-degeneracy condition can be imposed by making changes to ensure that each eigenvalues is unique (e.g., degeneracy occurs in quantum systems when two quantum states have the same energy). Another condition that can be imposed is that the dimensions of the matrix to equal its rank/cardinality (e.g., no zero eigenvalues, or the null-space of the first-order path matrix is empty). In certain implementations, a null-space of matrix can be defined as a kernel of the matrix. In certain implementations, a graph Laplacian can be used to generate the first-order path matrix. Further, the processing of the first-order path matrix can include ordering the vertices (e.g., changing which indices of the matrix correspond to which concepts/content of the graph/network). The result of step 210 is a processed first-order path matrix T.

In step 220 of process 120, powers of the processed first-order path matrix T are calculated and used to calculate a Surrogate Ranking Operator (SRO). For example, the $n^{th}$ power of T is represented as $T^n$. The second power matrix $T^2$ represents the connections with two edges between concepts. For example, in FIG. 2, 'bat' is connected to 'flight' by paths of two edges through 'flight' (link weights of 2.0 and 1.5), 'bird' (link weights of 1.7 and 2.8), and 'feathers' (link weights of 0.25 and 0.5). In certain implementations, the SRO is generated using the expression $$SRO = e^T + 1.$$

In practice this can be calculated using the Taylor series expansion $e^{\bar{T}} = \Sigma_i \bar{T}^i/i!$. Further, an Eigen-decomposition can be performed on the processed matrix $\bar{T}$ such that $$\bar{T} = Q\Lambda Q^{-1},$$

wherein $\Lambda$ is a diagonal matrix of the eigenvalues of the matrix $\bar{T}$, Q is unitary matrix in which the $n^{th}$ column vector is the eigenvector corresponding to the $n^{th}$ eigenvalue $\lambda_n = \Lambda_{n,n}$, and $Q^{-1}$ is the inverse of Q (i.e., the $n^{th}$ row vector is the complex conjugates of the $n^{th}$ column vector of Q). Accordingly, the $i^{th}$ power matrix simplifies to $\bar{T}^i = Q\Lambda^i Q^{-1}$, and $\Lambda^i$ simplifies to a diagonal of the $i^{th}$ power of the respective eigenvalues.

In certain implementations, the SRO is calculated as the expression $$SRO = e^{\bar{T}} + 1$$

for networks/graphs in which the nodes/vertices are unordered. Also, this expression can be used to calculate the SRO when the network/graph has an arbitrary permutations.

In certain implementations, the SRO is calculated as the expression $$SRO = 1 + \Sigma_i \bar{T}^i / 2^i e^{\bar{T}}$$

for networks/graphs in which the nodes/vertices are ordered. Also, this expression can be used to calculate the SRO when the network/graph is a binary system.

Note the matrix normalization discussed above includes the steps of computing a determinant of the matrix, and dividing each element of the matrix by the computed determinant. Further, matrix normalization can include computing a vector norm for each row of the matrix. Moreover, imposing a bio-stochasticity condition can include a verification process performed to verify that the normalized vector satisfies the condition of bio-stochasticity. Specifically it is ensured that the sum of elements of each row, and each column total to one. These processes would be understood by a person of ordinary skill in the art, and variations can be implemented without departing from the spirit of the invention, as would be understood by a person of ordinary skill in the art.

For example, in certain implementations, process 120 can include using feedback provided by the eigen-decomposition to detect degeneracy (e.g., when one or more eigenvalues is essentially zero relative to the other eigenvalues), and the changing data elements to eliminate or lift the degeneracy.

Further, in certain implementations, process 120 can include steps to return a path-adjusted SRO. For example, the redundant path erasure function can be applied as follows:

1) A datum that is a neighbor of itself is a path between two identical data elements in the same position in the network. Accordingly set the diagonal values to 1.0 to erase a self-path in which a datum is a neighbor of itself
2) All non-zero values of T are set to 1, and the diagonal values are set to 1.0 to yield a first-order-path matrix T1.
3) Square the matrix T1 (raising to a second power) to obtain the second-order path matrix T2.
4) At this point, there can exist some redundant paths such as: a-c-a.
5) To remove the redundancies, path erasure at second power of the matrix can be achieved by setting the diagonal to 1.0. This ensures that in a path a-b-c that 'a' does not equal 'c' so that paths like a-c-a are not counted in twice.
6) Cube the matrix T1 to obtain the third-order path matrix T3.
   Similarly to the second power case, there can be redundant paths. Let the third order path between data elements (a) and (b) be via (c) and (d). Therefore, three first-order paths in the third-order path matrix could be: a and c; c and d; d and b. First we ensure that c and d are not the same as either a or b. Note: By setting the diagonal elements to 1.0 to ensure first order path erasure, it ensures that a≠c and that d≠b. Path erasure at third order matrix powers follows a similar process: for paths such as a-b-c-d we wish to erase a-b-c-b and a-b-a-c patterns in order to ensure uniqueness. In order to do this, we use the zeroth-order path matrix, which is the original matrix T0 (e.g., the adjacency matrix). For each row of T0 we compute the sum of the elements to produce a column vector, C, of row costs (this is equivalent to the row vector of column sums of elements also since the path is bidirectional).

$$T = \begin{bmatrix} 0 & 1 & 1 & 1 \\ 1 & 0 & 0 & 1 \\ 1 & 0 & 0 & 1 \\ 1 & 1 & 1 & 0 \end{bmatrix} \xrightarrow{\Sigma rows} \begin{bmatrix} 3 \\ 2 \\ 2 \\ 3 \end{bmatrix}$$

7) The path redundancy matrix (of equivalent paths) is written as a path discount matrix to be subtracted from the third-order path matrix. The path discount matrix is computed for each of its elements, i,j, using the formula:

$$D_{i,j} = C_i + C_j - 1; \text{for } i \neq j$$

$$D_{i,j} = 0; \text{for } i = j$$

wherein, elements of the column vector are: $C_1 = 3$; $C_2 = 2$; $C_3 = 2$; $C_4 = 3$. Hence, (showing the calculation for the first row only):

$$D_{1,1} = 0$$

$$D_{1,2} = C_1 + C_2 - 1 = 3 + 2 - 1 = 4$$

$$D_{1,3} = C_1 + C_3 - 1 = 3 + 2 - 1 = 4$$

$$D_{1,4} = C_1 + C_4 - 1 = 3 + 3 - 1 = 5$$

The full matrix is computed:

$$D = \begin{bmatrix} 0 & 4 & 4 & 5 \\ 4 & 0 & 3 & 4 \\ 4 & 3 & 0 & 4 \\ 5 & 4 & 4 & 0 \end{bmatrix}$$

8) In order to correct the third-order path matrix by erasing the redundant paths, we transform T3 as follows:

$$T3 = T3 - D * T,$$

wherein the symbol '*' is the scalar element by element product of $D_{i,j} * T_{i',j'}$, for each i=i' and j=j'.

Then the SRO is calculated using the powers of the matrix T as described above.

In step 310 of process 130, an input vector is created in which zeros are filled into each data element of the vector.

Next, if a data-element in the ranking criteria has a property from the original matrix T, then set the value from 0 to 1 for the element of the vector at the corresponding index. Alternatively, for elements in the ranking criteria not original used in the graph/network, a measure of similarity to elements in the graph/network can be used to map the element onto one or more indices in the input vector. For example, the measure can be a Jaccard measure or other measure system. Consider a search criteria including the concept <eagle>, then a semantic distance measure, such as the Positive pointwise mutual information (PMMI) discussed in P. D. Turney and P. Pantel, "*From Frequency to Meaning: Vector Space Models of Semantics*," Journal of Artificial Intelligence Research 37, 141-181 (2010), incorporated herein by reference in its entirety, and as discussed in D. Jurafsky and J. H. Martin "Speech and Language Processing" Prentice Hall Series in Artificial Intelligence (2008), incorporated herein by reference in its entirety. The measure used to characterize proximity in semantic meaning might also be any of the measures discussed in U.S. Pat. No. 8,566,321, incorporated herein by reference. For example, the concept <eagle> might map primarily onto the concepts <bird> and to a lesser degree on the concepts of <feather> and <flight>.

Next, in step 320 of process 130, the SRO is applied using the dot product to multiple the input vector by the SRO. The result is an output vector providing values at each index for the corresponding element/vertex in the graph. The ranked list is generated by arranging the elements (e.g., concepts) of the graph according to the numerical order of the corresponding values of the output vector, as illustrated above for the ranking queries using criteria of <bird, flight> and <penguin>.

Figure 5:
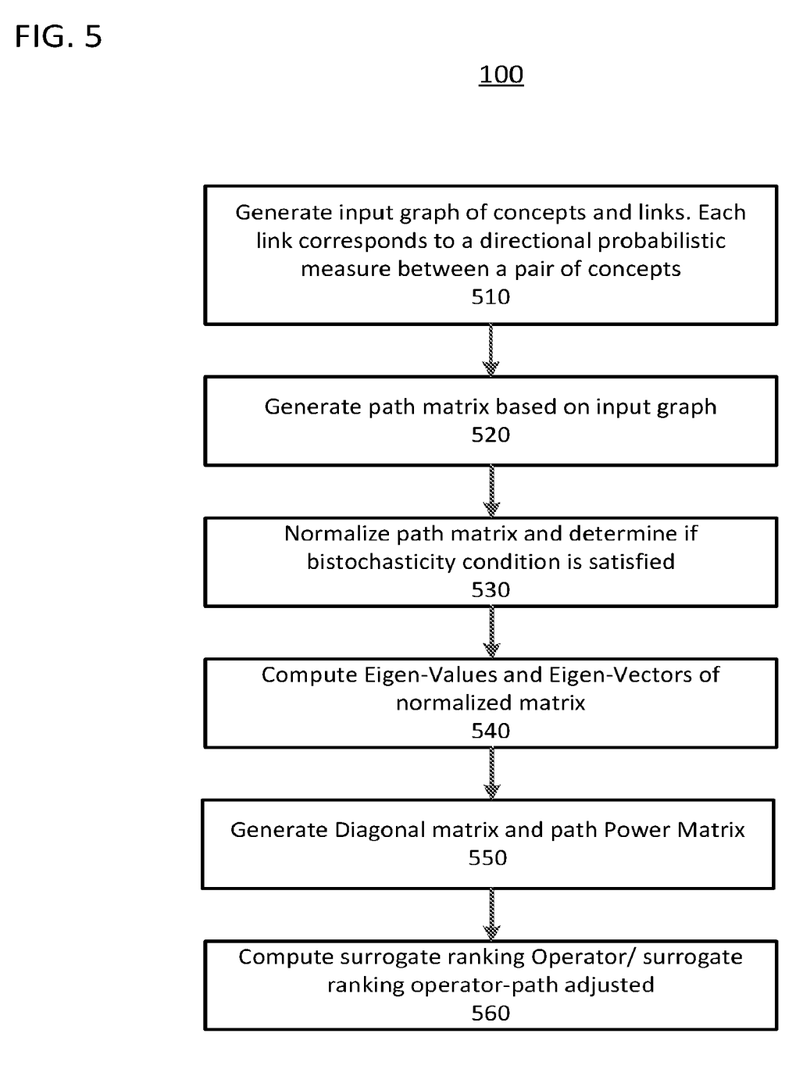
FIG. 5 shows another example of a flow diagram of the method of ranking the network nodes based on the input ranking criteria, according to one implementation.

FIG. 5 shows another flow diagram of method 100 according to another implementation.

In step 510, an input graph of concepts and links is generated. In certain implementations, each link of the graph corresponds to a directional probabilistic measure between a pair of concepts.

In step 520, a path matrix based on input graph is generated from the input graph.

In step 530, the path matrix is processed to satisfy various imposed conditions. For example, in certain implementations the processing normalizes the path matrix and determines if bistochasticity condition is satisfied, and if not processing can be performed to adjust the row (column) values to ensure bistochasticity.

In step 540, an eigen-decomposition is computed to generate eigenvalues and eigenvectors for the normalized matrix.

In step 550, a diagonal matrix of the eigenvalues is generated, and path power matrices are generated, wherein the n-path power matrix represents paths n links, respectively.

In step 560, surrogate ranking operator (or path-adjusted surrogate ranking operator) is computed.

Variations of method 100 can be implemented without deviating from the spirit of the method, as would be understood by a person of ordinary skill in the art.

In certain implementations, the SRO can be an augmented surrogate ranking operator. For example, in the case that there is external meta-data to label the data items, additional rows and columns comprising the meta-data relationship to the data can be added to the first order path matrix (e.g., an author network and rank in the context of a network such as the World Wide Web). The process then proceeds as before. This step can be used to augment or personalize the matrix.

In certain implementations, the SRO can be a biased surrogate ranking operator. For example, the SRO can be operated upon by a preference-matrix. This provides a personalized preference over ranking and the preferences are computed on a per user basis. This enables personalized indexing and search. For example, a preference matrix can be introduced as a matrix inserted in the process of calculating the power matrices before the power series is calculated to generate the SRO. In certain implementations, a personal preference matrix, relative to a general population used to generate the SRO, can be learned and applied to a state vector representing the ranking criteria, or can be applied directly to the SRO after it has been calculated.

As discussed above, there are different ways in which network nodes can be interrelated. In FIG. 2, the nodes are related by weighted edges. However, in other networks the nodes might be simply connected by edges without weights, or in a more complicated scenario the edges could be directed. Still in other networks/graphs the connections/edges can include expressions of similarity or affinity/like, which might be expressed as a sign of the edge. Accordingly, different types of first-order path matrices can be used to express the relationships in these different types of networks/graphs, and, consequently, different types of SROs will result from these different types of first-order path matrices. Nevertheless, the generalization of the above-described method 100 and processes 110, 120, and 130 to the other data types would be straightforward and would not depart from the spirit of the invention, as would be understood by a person of ordinary skill in the art. Several of the types of links between network nodes are listed in Table 2 together with the type of numbers/data structure used to represent them in the first-order path matrix and SRO and the semantics which the link types convey. Accordingly, the surrogate ranking operator comes in several distinct semantic types as show in Table 2.

TABLE 2

Surrogate Ranking Operator Types and their Semantics

| Type | Links | Representation | Semantics |
|---|---|---|---|
| 1 | Undirected | Matrix of reals | Correlations |
| 2 | Unidirectional | matrix of bivectors (complex numbers) | Associations |
| 3 | Bidirectional | Matrix of split-complex (bicomplex numbers) tessarines | Orientations |
| 4 | Mixed | Matrix of multivectors | Attitudinal |

Figure 6:
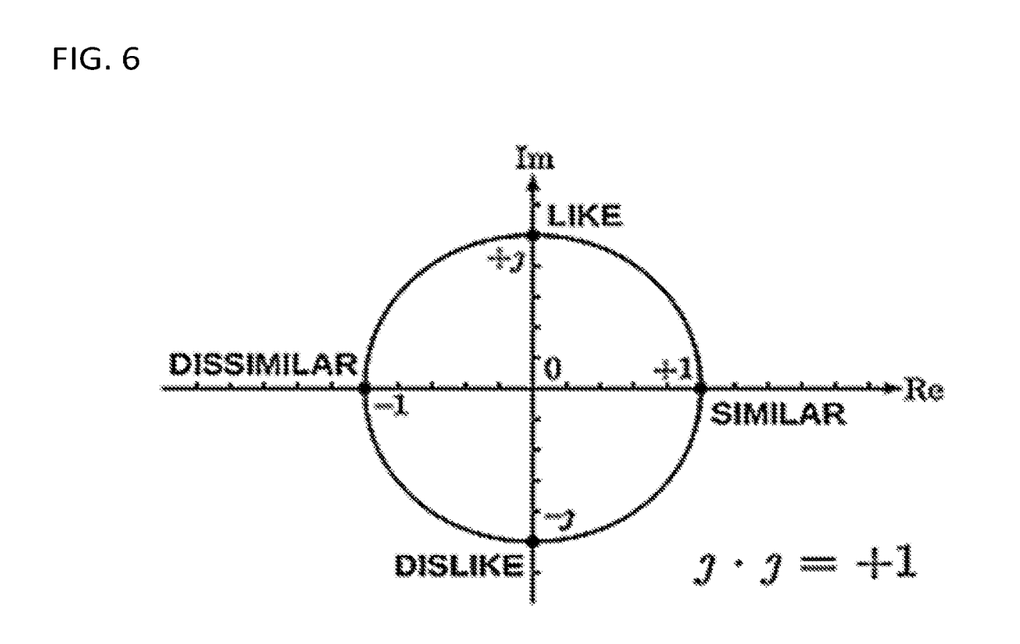
FIG. 6 shows an example of using bicomplex numbers to represent bidirectional links, according to one implementation.

The split-complex numbers were introduced in 1848 by James Cockle: they are a special case of the tessarines and so were called real tessarines. The bicomplex numbers form a ring and not a field like the reals. The split-complex numbers are often studied together with number systems such as the quaternions, for instance by William Clifford in 1873. Split-complex numbers are also called bicomplex or hyperbolic complex numbers because they can represent hyperbolic angles. However the interpretation is that orientations can be encoded such as synonymy versus antonymy or similarity versus dissimilarity or likes versus dislikes in preferences as illustrated in FIG. 6.

Also, as discussed above, the SRO is inspired, in part, by analogies in quantum mechanics and quantum graph theory. For example, in quantum mechanics, the fundamental equation is the Schrodinger equation $$i\hbar \frac{\partial \Psi_t}{\partial t} = H\Psi_t,$$

Which can be solved in the Heisenberg picture using the unitary evolution operator $U_t = e^{i\hbar tH}$, such that $$\Psi_t = U_t \Psi_0.$$

In particular, when the potential U(x) is zero the Hamiltonian simplifies to a value proportional to a Laplacian $\nabla^2$;

$$H = -\frac{\hbar^2}{2m}\nabla^2 + U(x) \propto -\nabla^2.$$

Further, in graph quantum mechanics the, the graph Laplacian $\nabla^2$ is the adjacency matrix plus a diagonal matrix of the valance of the respective vertices of the graph. A person of ordinary skill in the art would recognize that this the discretized second order derivative. It can also be noted that this Laplacian operator is a variation of a first-order path matrix and is related to the first-order path matrix T described above. Further, the evolution operator $U_t$ is related to the SRO, except in the SRO the terms $i\hbar t/2m$ are set to one (e.g., in certain implementations the SRO can be viewed as a diffusion equation rather than a wave equation).

In view of the above similarities, some of the theoretical apparatus of quantum mechanics and quantum field theory can be utilized to generate and apply the SRO. Accordingly, not only graph theory but also quantum graph theory can be applied to the problem of rapidly ranking vertices based on a given ranking criteria. That is the SRO represent concepts that are rooted in the foundations of graph theory and that these concepts can be extended from graph theory to quantum graph theory.

Certain implementations of the methods described herein use a general approach to network theory for the semantics and behavioral properties of associating density matrices (as well as eigen-elements) of graphs of both combinatorial and signless Laplacian matrices associated with corresponding weighted directed graphs with complex edge weights where the graphs can be acyclic or cyclic.

One advantage of leveraging the tools of quantum graph theory is that quantum theory has been formulated by Richard Feynman using a sum-over-histories, which carries over into the graph theory and enables the SRO to perform in a single step what would otherwise require a computationally intensive multi-step process of recursively traversing nodes of the network.

For example, in one approach to graph theory (i.e., Quantum Graph Theory, as discussed in P. Mnev, "*Quantum mechanics on graphs*," MPIM Jahrbuch 2016, available at, https://www3.nd.edu/~pmnev/graphQM.pdf, incorporated herein by reference in its entirety) the modularity of graphs is used to compute a discretization of the Feynman path integral. These path-integral results provide counts of paths having topological invariants characteristic of types of graphs. This can apply to models of propagation of information in networks such as internet-networks, social networks, and linguistic (semantic) networks, complexity measures and potentially also material science parameterization.

This path integral formulation of quantum mechanics can be recast from the Schrodinger time evolution wave equation, and the above discussion, as well as the additional discussion below, illustrates how paths in a graph are formulated based on such a path integral based approach and also how this works within the context of a wave equation. As discussed above the Laplacian operator $\nabla^2$ is a first-order path matrix defined in terms of an adjacency operator and a valency operator. We can:

1. Define the adjacency operator (i.e. the matrix of vertex adjacencies, a coboundary): A
2. Define the valency operator (i.e. the cardinality of incidences at vertices, a boundary): v
3. Define the incidence operator with respect to a chosen orientation, which maps an edge to the difference of its endpoints (boundary and coboundary): $\Gamma$ Then, the Laplacian operator is defined as: $\nabla^2 = v - A = \Gamma\Gamma^*$.

In certain implementations, the definition of the graph Laplacian can be applied to generate the first-order path metric using the values of links/edges between nodes/vertices to generate a link dependent diffusion coefficient of a diffusion finite difference equation. For example, the diffusion equation can be expressed as $$\frac{\partial \Phi}{\partial t} = D\nabla^2 \Phi,$$

wherein D is a diffusion coefficient. The diffusion equation in one dimension can be approximated by the difference equation $$\varphi_{t+1,x} = \varphi_{t,x} + \frac{D\Delta t}{\Delta x^2}(\varphi_{t,x-1} + \varphi_{t,x+1} - 2\varphi_{t,x}),$$

wherein $\varphi_{t\pm 1, x\pm 1} = \Phi(t\pm\Delta t, x\pm\Delta x)$ the term in parenthesis on the right hand side can be recognized as being the graph Laplacian for a graph representing a Cartesian grid with spacing $\Delta x$ in the x-direction. If the diffusion coefficient is allowed to vary as a function of position, then the difference equation becomes $$\varphi_{t+1,x} = \varphi_{t,x} + \frac{\Delta t}{\Delta x^2}(D_{x-1}\varphi_{t,x-1} + D_{x+1}\varphi_{t,x+1} - (D_{x+1} + D_{x-1})\varphi_{t,x}).$$

In two dimensions the difference equation becomes $$\varphi_{t+1,x,y} = \varphi_{t,x,y} + \frac{\Delta t}{\Delta x^2}(D_{x-1,y}\varphi_{t,x-1,y} + D_{x+1,y}\varphi_{t,x+1,y} - (D_{x+1,y} + D_{x-1,y})\varphi_{t,x,y}) + \frac{\Delta t}{\Delta y^2}(D_{x,y-1}\varphi_{t,x,y-1} + D_{x,y+1}\varphi_{t,x,y+1} - (D_{x,y-1} + D_{x,y+1})\varphi_{t,x,y}).$$

Arranging $\varphi$ at time t as a vector (i.e., $V_t = [\varphi_{t,x,y}, \varphi_{t,x+1,y}, \varphi_{t,x+1,y+1}, \ldots, \varphi_{t,x+n,y+n}]$), the above difference equation can be expressed as a matrix equation $V_{t+1} = M V_t$. In which the matrix M satisfies the bistochasticity condition similar to certain implementations of the first-order path matrix. Further comparisons between the matrix M and the first-order path matrix reveal that, in certain implementations, the first-order path matric can be understood as a graph diffusion operator corresponding to a particular choice of $\Delta t/\Delta x^2$ and $\Delta t/\Delta y^2$ and with a "spatially" varying diffusion coefficient corresponding to the link/edge weights between nodes/vertices. The primary difference is that, unlike the matrix M, the first-order path matrix is not limited to a uniform Cartesian grid, but can be generated on any graph. Further, the analogy to diffusion can be generalized, as would be understood by a person of ordinary skill in the art, to cases in which links between nodes include information and relations beyond weighting, such as directionality, orientations, and attitudinal relations between nodes, as discussed above (see, e.g., FIG. 6 and Table 2).

Also, as discussed above, in certain implementations, removing redundancies can be important to generating. For example, the path from one node to some other node: p→s can included redundancies. Assuming that there is a chain: p→q, q→r, r→s. Therefore, taking the adjacency operator, A, the paths, X is:

$$X(p \to s) = A^3_{p \to s} = \sum_{p \to s} A_{p \to q} A_{q \to r} A_{r \to s}$$

Therefore, for an integer enumeration N={1, 2, . . . , n} and the path set X={p,q,r,s}, the path set can be seen as a discrete path in the set N from p to s. As discussed above, within a path set there can be redundancies, but these can be accounted for and overcome using the methods described above. That is, in certain implementations, the path adjusted ARO is used to account for the fact that the matrix coefficients of the powers of the first-order path matrix are equivalent to sums of terms; one term for each path from some column index to some row index, and that redundancies can be accounted for in order to not double-count contributions when multiple terms correspond to the same path, as discussed in C. Yu "Super-Walk Formulae for Even and Odd Laplacians in Finite Graphs," Rose-Hulman Undergraduate Mathematics Journal, Volume 18, No. 1, Spring 2017, incorporated herein by reference in its entirety.

Returning to the discussion of generating the SRO, in quantum mechanics the evolution operator is generated by exponentiating a matrix H (e.g., the Hamiltonian) as follows:

$$U_t = e^{tH}.$$

Analogously, the matrix coefficients of $U_t$ are integrals (analogous to the sum) over continuous paths in the space, S, whose discrete representation is a graph, a sequence of node to node intervals interspersed with jumps. For the quantum case it is a wave equation that includes an imaginary number in the exponent, but for the graph Planck's constant is dropped, as given by the equation $$U_t = e^{itH}$$

This equation can be further analogized in the sense that in quantum field theory, the operators act on a Hilbert space where states are complex valued functions on R and $U_t$ is an integral operator (representing the potential in the field). Once the operations are discrete and in a graph, they are finite dimensional and $U_t$ can be developed in a discrete path integral formalism for computation as interaction since no system is closed nor separated from the external system (i.e. there is boundary of interactions at which computations occur unlike classically idealized systems which are treated as fully insulated). In QFT the evolution of states is described by a partition function that acts as a solution to the Schrodinger operator:

$$\frac{\partial \Psi_t}{\partial t} = -\Delta \Psi_t = e^{(-\Delta t)\Psi_0}; Z(t) = e^{(-\Delta t)}$$

Here, we see that Z(t) is the partition function. Different partition functions can be designed for different graphs. For example, in certain implementations, the partition function can take the form, for t=[0 . . . ∞), $$Z_G(t) = \sum_{k=0}^{\infty} \frac{A^k}{\frac{1}{2\sqrt{5}}\left[\left(\frac{1+\sqrt{5}}{2}\right)^k - \left(\frac{1-\sqrt{5}}{2}\right)^k\right]} t^k = e^{(tA_G)}$$

There are several important consequences to this form of the partition function, including the relationships of Z as the partition function to quasicrystalline structures. Different choices of the partition function used to calculate the SRO will have different advantageous effects for ranking the vertices of the graph.

Given an initial state (e.g., the input vector expressing the ranking criteria), the evolution of states is computable using a partition function: the partition function pays the role of the evolution operator, and the graph Laplacian in turn forms the basis for the evolution operator.

The evolution of a system in QFT is determined by a Partition Function Z(M), where M is a manifold which models the space of fields (in our case, our graphs seen from the viewpoint of fields). Its behavior depends on the combinatorics of the network itself. Further, the partition function associated to the graph is an exponential, and the argument of the exponential is selected according to desired outcome/inquiry. For example, for an inquiry regarding ranking an Adjacency operator is used as the argument (e.g., the first-order path matrix T). On the other hand, for an inquiry regarding or the propagation of information the argument in the exponential can be the Laplacian operator multiplied by an imaginary number. By analyzing the spectrum of these operators, explicit solutions are produced to the ranking or propagation questions. Further, in casting the partitioning function in terms of charts and atlases the gluing property of Z(M) can be characterized, and, therefore, provide quantitative characterization when merging two networks (as in information fusion, database warehousing, interoperability and many other behaviors).

Using the SRO, as described herein, to perform a ranking of a network has several advantages over conventional methods. For example, the methods described herein implement a unique approach to calculating the relative ranking between vertices, or nodes, in a network (e.g., networks to which the methods can be applied include cybersecurity, medical informatics, social, symbolic, semantic, Web networks, etc.). The ranking operator computes the ranking based on input ranking criteria (i.e., a state vector representing data elements of the type represented at the network nodes), and orders the nodes in accordance with the ranking.

The nodes are not restricted to a particular type. For example, the nodes can be raw data, but the nodes can also be a network of agents, as discussed in U.S. patent application Ser. No. 14/965,728 and U.S. patent application Ser. No. 14/971,769, both of which are incorporated herein by reference in their entirety. A network of agents can be trained, for example, using a machine learning method, and the network connections used for the first-order path matrix once the network has reached a Nash equilibrium by training on raw data (e.g., empirical measurements) that is used as the training data.

Accordingly, the ranking operator maps one state vector, which is the state represented by positions of nodes in a graph, to another state vector, which is the state represented by ranks between nodes in a sub-graph. By virtue of these attributes, the methods described herein enable convergence to a unique dominant eigenvector without the need for a "fudge factor" to force irreducibility, as used by PageRank, for example. Further, the methods described herein enable greater accuracy to distinguish among elements of ranked vectors. That is, the SRO is a precise and accurate construct of the underlying relational network structure. The methods described herein further enable personalization (e.g., using the preference-matrix to modify and personalize an SRO learned using data from a general population). Accordingly, the methods described herein provide a general approach to network ranging for tasks such as information retrieval and recommendation engines, to name just a few of the many applications that are benefited by the SRO.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Features of the invention can be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMID of America and an operating system, such as Microsoft VISTA, UNIX, Solaris, LINUX, Apple, MAC-OSX and other operating systems known to those skilled in the art.

Figure 7:
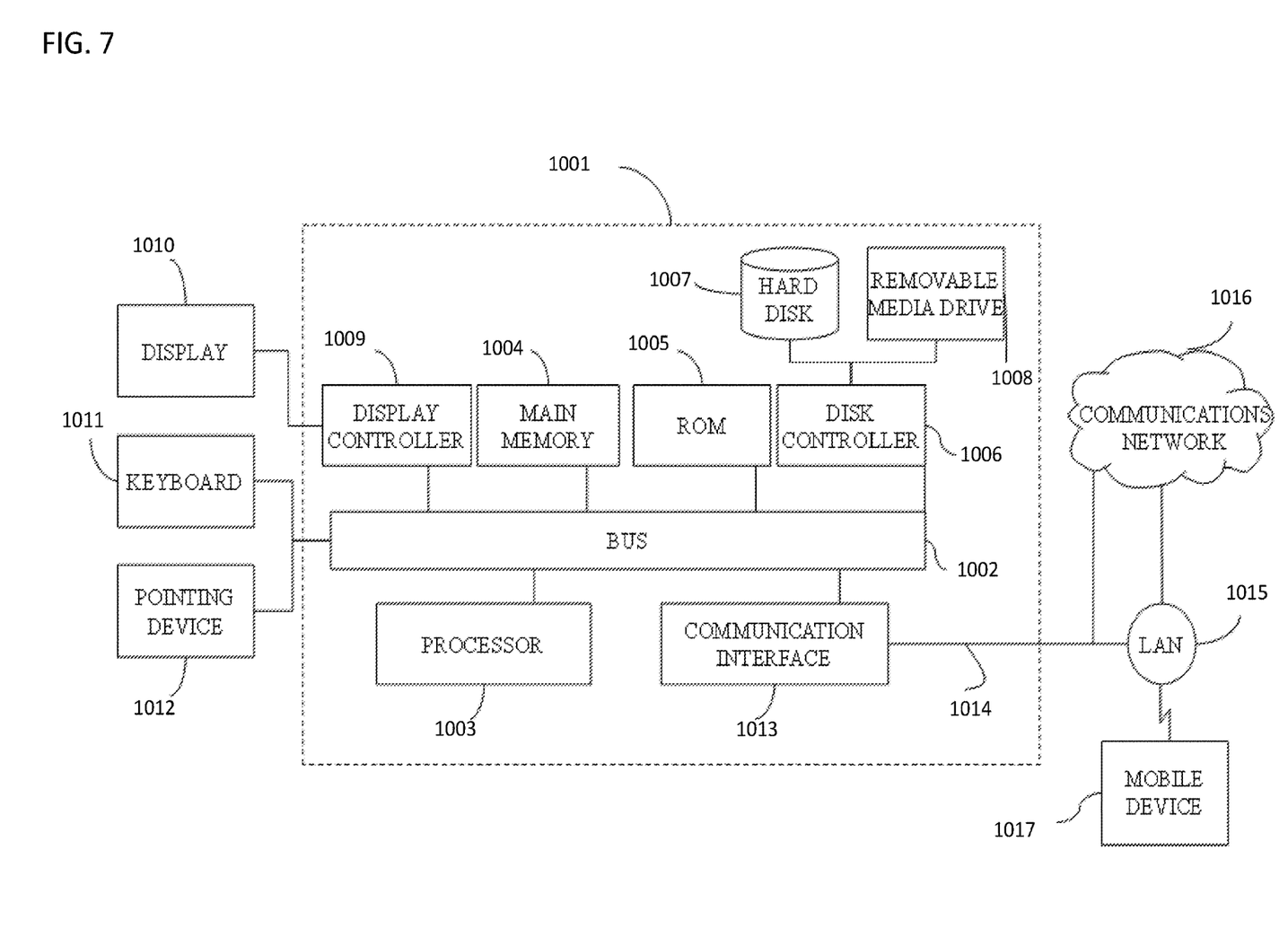
FIG. 7 shows an example of computing hardware implementing the method of ranking the network nodes based on the input ranking criteria.

In addition, the invention can be implemented using a computer based system 1000, as exemplified in FIG. 7. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 1000 may be, a mobile device such as a personal digital assistant (PDA) laptop computer, or cellular telephone.

While certain implementations have been described, these implementations have been presented by way of example only, and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure. The accompanying claims and their equivalents are intended to cover.

The invention claimed is:

1. A website ranking apparatus for a network ranging from tasks including information retrieval to recommendation engines, comprising:

a network communications interface connected to an interne including websites, and configured to receive data elements from the websites;

a memory configured to store a database of the websites, the database of the websites including a plurality of nodes respectively representing the websites and the data elements received therefrom, and the plurality of nodes respectively representing the websites being respectively connected by a plurality of links representing connections between the websites; and processing circuitry configured to receive an input query from a user via a user interface, and rank the websites according to the input query of the user by:

determining a first-order path matrix including values representing one-link paths between pairs of the plurality of nodes respectively representing the websites that are connected by a respective one of the plurality of links representing the connections between the websites;

generating a surrogate ranking operator (SRO) using a power series of the first-order path matrix, wherein the SRO is generated by:

decomposing the first-order path matrix into eigenvalues and eigenvectors to generate a diagonal matrix of the eigenvalues, a unitary matrix having the eigenvectors as column vectors, and a Hermitian conjugate of the unitary matrix;

generating nth-order path matrices as an nth power of the first-order path matrix, by taking an nth power of the diagonal matrix of the eigenvalues and multiplying on a left by the unitary matrix and on a right by the Hermitian conjugate of the unitary matrix;

summing the nth-order path matrices using a power series of the first-order path matrix; and summing the power series of the first-order path matrix such that, in the power series of the first-order path matrix, each nth-order path matrix in the power series of the first-order path matrix is divided by 2 raised to an nth power, when the plurality of links representing the connections between the websites are ordered, and each nth-order path matrix in the power series of the first-order path matrix is divided by a factorial of n, when the plurality of links representing the connections between the websites are not ordered; and ranking the websites using a matrix product between a state vector of the input query of the user and the SRO;

generating a list of the ranked websites by arranging the websites based on the matrix product; and providing, via a display, the list of the ranked websites to the user as a recommendation of best websites in response to and satisfying the input query of the user.

2. A recommender apparatus for a network ranging from tasks including information retrieval to recommendation engines, comprising:
a memory configured to store a database of a network, the database of the network including a plurality of nodes containing respective data elements, and the plurality of nodes being respectively connected by a plurality of links; and
processing circuitry configured to receive an input query from a user via a user interface, and rank the nodes according to the input query from the user by:
determining a first-order path matrix including values representing first-order adjacencies from a plurality of links, of the plurality of links, that connect the plurality of nodes of the database of the network;
generating a surrogate ranking operator (SRO) using a power series of the first-order path matrix, wherein the SRO is generated by:
decomposing the first-order path matrix into eigenvalues and eigenvectors to generate a diagonal matrix of the eigenvalues, a unitary matrix having the eigenvectors as column vectors, and a Hermitian conjugate of the unitary matrix;
generating nth-order path matrices as an nth power of the first-order path matrix, by taking an nth power of the diagonal matrix of the eigenvalues and multiplying on a left by the unitary matrix and on a right by the Hermitian conjugate of the unitary matrix;
summing the nth-order path matrices using a power series of the first-order path matrix; and
summing the power series of the first-order path matrix such that, in the power series of the first-order path matrix, each nth-order path matrix in the power series of the first-order path matrix is divided by 2 raised to an nth power, when the plurality of links are ordered, and each nth-order path matrix in the power series of the first-order path matrix is divided by a factorial of n, when the plurality of links are not ordered;
receiving one or more input data elements of the respective data elements representing ranking criteria, and generate an input state vector of the input data elements;
ranking the nodes of the network using a matrix product of the SRO and the input state vector of the input data elements;
generating a list of the ranked nodes by arranging the nodes based on the matrix product; and
providing, via a display, the ranked nodes to the user as recommendations corresponding to the one or more input data elements of the respective data elements.

3. The recommender apparatus of claim 2, wherein the network is one of a cybersecurity network, a medical-informatics network, a social network, a symbolic network, a semantic network, a World Wide Web, a local area network, and a web network.

4. The recommender apparatus of claim 2, wherein the eigenvalues represent a spectrum of the first-order path matrix.

5. The recommender apparatus of claim 2, wherein the processing circuitry is further configured to modify the first-order path matrix prior to generating the SRO by:
normalizing the first-order path matrix using a determinant of the first-order path matrix and
ensuring that the first-order path matrix satisfies a bistochasticity condition,
wherein the SRO is generated using the modified first-order path matrix to calculate the power series of the first-order path matrix.

6. The recommender apparatus of claim 2, wherein the first-order path matrix is a discrete approximation to a diffusion operator, wherein a rate of diffusion is greater across links of the plurality of links that represent a greater connection between pairs of nodes corresponding to respective links.

7. The recommender apparatus of claim 2, wherein the processing circuitry is further configured to determine the first-order path matrix using:
elements of the first-order path matrix that are real numbers when links, of the plurality of links, expressed are undirected,
elements of the first-order path matrix that are one of bivectors and complex numbers when the plurality of links are unidirectional,
elements of the first-order path matrix that are one of tessarines, bicomplex numbers, and split complex numbers when the plurality of links are bidirectional, and
elements of the first-order path matrix that are multivectors when the plurality of links are mixed.

8. The recommender apparatus of claim 2, wherein the processing circuitry is further configured to determine the first-order path matrix using:
elements of the first-order path matrix that are real numbers when links, of the plurality of links, expressed correlations between pairs of nodes of the network,
elements of the first-order path matrix that are one of bivectors and complex numbers when links, of the plurality of links, expressed associations between pairs of nodes of the network,
elements of the first-order path matrix that are one of tessarines, bicomplex numbers, and split complex numbers when links, of the plurality of links, expressed associations between pairs of nodes of the network, and
elements of the first-order path matrix that are multivectors when links, of the plurality of links, expressed attitudinal relationships between pairs of nodes of the network.

9. The recommender apparatus of claim 2, wherein the processing circuitry is further configured to generate the SRO by eliminating degeneracy in the eigenvalues before generating the diagonal matrix of the eigenvalues.

10. The recommender apparatus of claim 2, wherein the processing circuitry is further configured to generate the SRO that is path adjusted by removing path redundancies in the nth-order path matrices prior to summing the nth-order path matrices using the power series of the first-order path matrix.

11. The recommender apparatus of claim 2, wherein the processing circuitry is further configured to rank the nodes of the network using metadata to augment the SRO.

12. The recommender apparatus of claim 2, wherein the processing circuitry is further configured to rank the nodes of the network using a personalized preference matrix together with the SRO to personalize the rank of the nodes of the network according to personal preferences of a user.

13. The recommender apparatus of claim 2, wherein when the one or more input data elements of the respective data elements include at least one data element that is absent from the data elements contained by the plurality of nodes, the processing circuitry is further configured to map the at least one data element onto the input state vector of the input data elements using a measure that is one of a conceptual relativity measure, a semantic distance measure, a Jaccard measure, a mutual information measure, and a positive pointwise mutual information measure.

14. The recommender apparatus of claim 2, wherein the first-order path matrix is based on an operator of quantum graph theory that is one of a Hamiltonian operator, a Laplacian operator, and a Lagrangian operator.

15. A method of recommending nodes of a database by ranking the database for a network ranging from tasks including information retrieval to recommendation engines, the method comprising:

storing, in a non-transitory computer readable medium, a database of a network, the database including a plurality of nodes containing respective data elements, and the plurality of nodes being respectively connected by a plurality of links;

receiving, using processing circuitry, an input query from a user via a user interface;

ranking, using processing circuitry, the nodes according to the input query from the user by:

determining, using processing circuitry, a first-order path matrix including values representing first-order adjacencies from the plurality of links that connect the plurality of nodes of the database of the network;

generating, using the processing circuitry, a surrogate ranking operator (SRO) using a power series of the first-order path matrix, wherein the SRO is generated by:

decomposing the first-order path matrix into eigenvalues and eigenvectors to generate a diagonal matrix of the eigenvalues, a unitary matrix having the eigenvectors as column vectors, and a Hermitian conjugate of the unitary matrix;

generating nth-order path matrices as an nth power of the first-order path matrix, by taking an nth power of the diagonal matrix of the eigenvalues and multiplying on a left by the unitary matrix and on a right by the Hermitian conjugate of the unitary matrix;

summing the nth-order path matrices using a power series of the first-order path matrix; and summing the power series of the first-order path matrix such that, in the power series of the first-order path matrix, each nth-order path matrix in the power series of the first-order path matrix is divided by 2 raised to an nth power, when the plurality of links are ordered, and each nth-order path matrix in the power series of the first-order path matrix is divided by a factorial of n, when the plurality of links are not ordered;

receiving one or more input data elements of the respective data elements representing ranking criteria, and generate an input state vector of the input data elements;

ranking, using the processing circuitry, the nodes of the network using a matrix product of the SRO and the input state vector of the input data elements;

generating a list of the ranked nodes by arranging the nodes based on the matrix product; and providing, via a display, the ranked nodes to the user as recommendations corresponding to the one or more input data elements of the respective data elements.

16. A non-transitory computer-readable medium storing executable instructions, wherein the executable instructions, when executed by processing circuitry, cause the processing circuitry to perform the method according to claim 15 of recommending nodes of the database by ranking the database.

\* \* \* \* \*